(12) United States Patent
Suzuki

(10) Patent No.: US 7,059,750 B2
(45) Date of Patent: Jun. 13, 2006

(54) HEADLAMP

(75) Inventor: Eiji Suzuki, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 162 days.

(21) Appl. No.: 10/715,120

(22) Filed: Nov. 18, 2003

(65) Prior Publication Data

US 2004/0145907 A1 Jul. 29, 2004

(30) Foreign Application Priority Data

Nov. 28, 2002 (JP) ............................ 2002-346323

(51) Int. Cl.
*F21V 17/02* (2006.01)
*B60Q 1/14* (2006.01)

(52) U.S. Cl. ........................ 362/513; 362/280; 362/321

(58) Field of Classification Search ................ 362/280, 362/284, 323, 324, 512, 513
See application file for complete search history.

(56) References Cited

U.S. PATENT DOCUMENTS

| | | | |
|---|---|---|---|
| 4,951,178 A * | 8/1990 | Shirai et al. ................ | 362/512 |
| 5,899,559 A | 5/1999 | Lachmayer et al. | |
| 6,179,455 B1 * | 1/2001 | Taniuchi ..................... | 362/507 |
| 6,425,683 B1 * | 7/2002 | Kusagaya et al. .......... | 362/512 |
| 6,837,601 B1 * | 1/2005 | Tatsukawa .................. | 362/512 |

| | | | |
|---|---|---|---|
| 2001/0010634 A1 * | 8/2001 | Yokoi ......................... | 362/512 |

FOREIGN PATENT DOCUMENTS

| | | |
|---|---|---|
| JP | 2000-48621 A | 2/2000 |
| JP | 2000-123623 A | 4/2000 |
| JP | 2001-229728 A | 8/2001 |
| JP | 2001-319506 A | 11/2001 |

OTHER PUBLICATIONS

L. Sigfred Linderoth, Jr., "Spring (machines)", Aug. 16, 2002, AccessScience@McGraw-Hill, http://www.access-science.com, DOI 10.1036/1097-8542.648800.*

Jerome Meisel, "Solenoid (electricity)", Apr. 15, 2003, AccessScience@McGraw-Hill, http://www.accessscience.com, DOI 10.1036-1097-8542.634200.*

The Penguin Dictionary of Physics, "Force Symbol:F", 2000, from xreferplus, http://www.xreferplus.com/entry/1428904.*

* cited by examiner

*Primary Examiner*—Alan Cariaso
(74) *Attorney, Agent, or Firm*—Foley & Lardner LLP

(57) ABSTRACT

When a position of an adjustable shade is switched from a low beam position to a high beam position, a spring acts so as to attenuate an repulsion force or attraction force of the solenoid rapidly due to a sudden increase in an elastic force of the spring at the end of the movement of the adjustable shade toward the high beam position. As a result, the operating noise at the time of switching the position of the adjustable shade is considerably reduced.

15 Claims, 9 Drawing Sheets

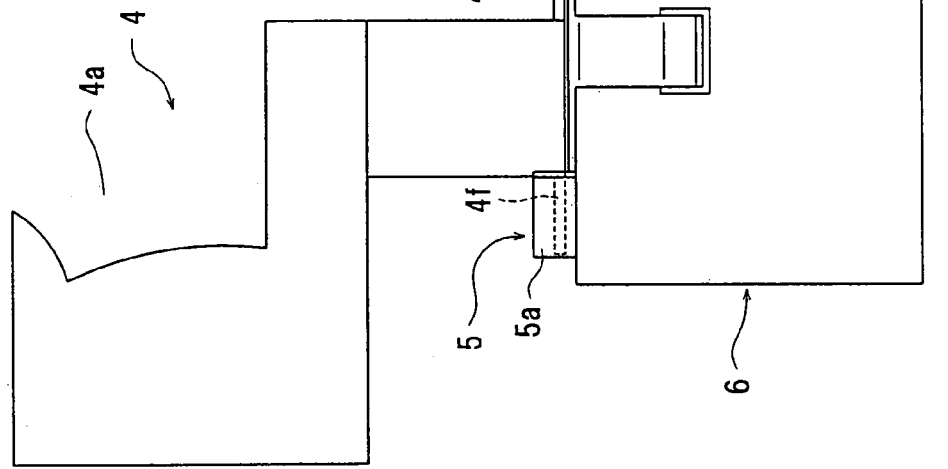
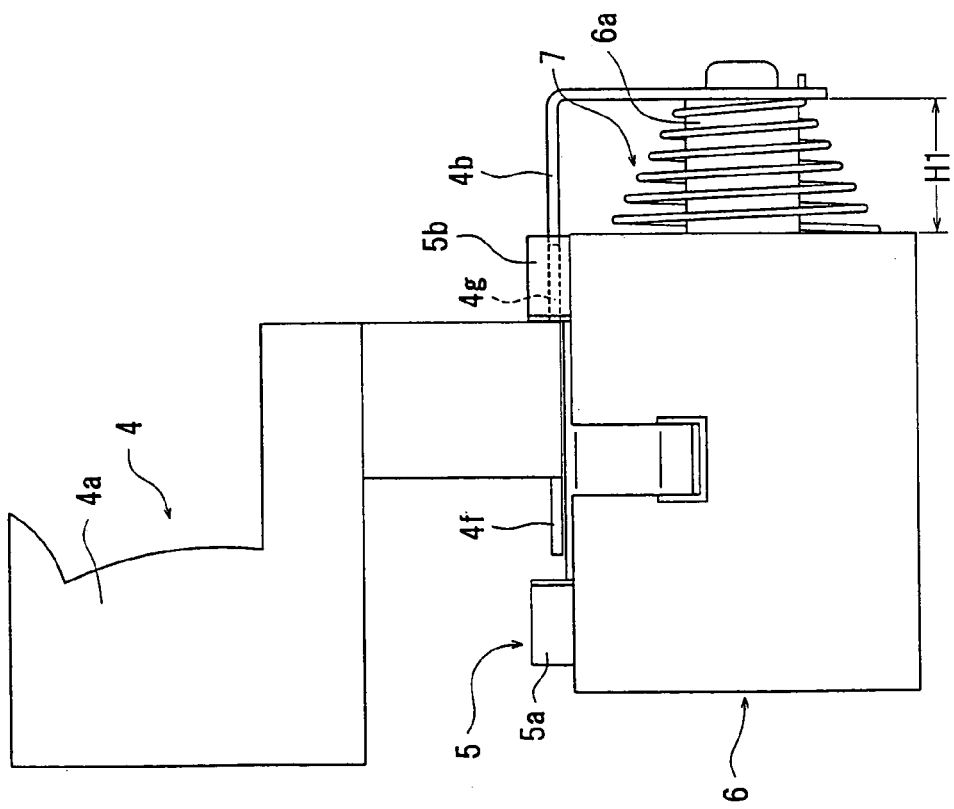

HEADLAMP

CROSS-REFERENCE TO RELATED APPLICATIONS

The present document incorporates by reference the entire contents of Japanese priority document, 2002-346323 filed in Japan on Nov. 28, 2002.

BACKGROUND OF THE INVENTION

1. Field of the Invention

The present invention relates to a headlamp, and more particularly, a headlamp for vehicles from which a light distribution patterns for low beam and high beam can be obtained from one light source by switching a position of an adjustable shade using a solenoid and a spring.

2. Description of the Related Art

U.S. Pat. No. 5,899,559, for example, discloses a headlamp including a light source, a reflector that reflects light from the light source to obtain light distribution patterns for low beam and high beam, an adjustable shade that switches a range of light reflection from the light source to the reflector, a solenoid that switches a position of the adjustable shade, and a spring that returns the switched adjustable shade to the original position.

Upon turning on the light source, light from the light source is irradiated onto the reflector. The position of the adjustable shade is switched either to a low beam position or to a high beam position, thereby to switch the range irradiated onto the reflector. For example, when an electric current is applied to a coil of the solenoid, the solenoid generates an attraction force, and the adjustable shade is switched to the high beam position. When applying of the electric current to the solenoid is stopped, the solenoid loses the attraction force, and the adjustable shade returns to the low beam position by an elastic force of the spring.

In this headlamp, a stopper mechanism is used for reliably stopping the adjustable shade at the low beam position or at the high beam position. This stopper mechanism comprises a movable side such as the adjustable shade or a plunger of the solenoid, and a fixed side such as a stopper, which abuts against the movable side. At the time of switching the position of the adjustable shade, since the movable side abuts against the fixed side, the stopping mechanism makes an annoying noise. This noise is offensive to human ears, and gives an uncomfortable feeling to passengers in a vehicle. Particularly, in a quiet vehicle, this noise becomes quite a problem.

SUMMARY OF THE INVENTION

It is an object of the present invention to solve at least the problems in the conventional technology.

The headlamp according to one aspect of the present invention includes a light source, a shade that forms a light distribution pattern for a low beam when the shade is in a low beam position and a light distribution pattern for a high beam when the shade is in a high beam position with a light from the light source, a solenoid that shifts the shade from the low beam position to the high beam position, a stopper mechanism that stops the shade at either of the low beam position and the high beam position, and a spring that shifts back the shade from the high beam position to the low beam position.

The other objects, features and advantages of the present invention are specifically set forth in or will become apparent from the following detailed descriptions of the invention when read in conjunction with the accompanying drawings.

BRIEF DESCRIPTION OF THE DRAWING

FIG. 5A is a schematic diagram of the headlamp with the adjustable shade at a low beam position;

FIG. 5B is a schematic diagram of the headlamp with the adjustable shade at a high beam position;

DETAILED DESCRIPTIONS

Exemplary embodiments of a headlamp according to the present invention are explained in detail with reference to the accompanying drawings. However, the present invention is not limited by the exemplary embodiments.

Figure 1:
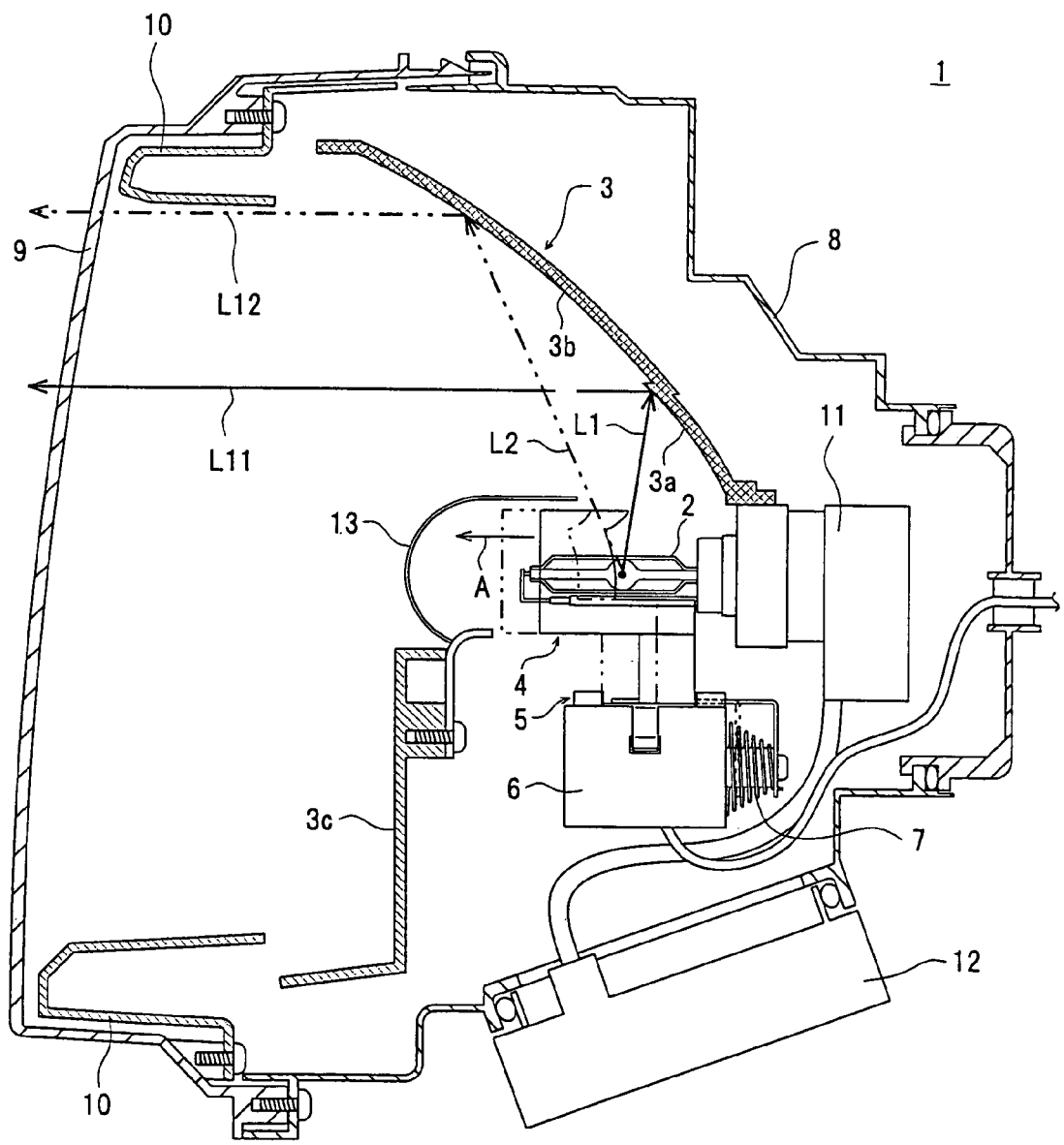
FIG. 1 is a schematic diagram of a headlamp according to the present invention.
Figure 2:
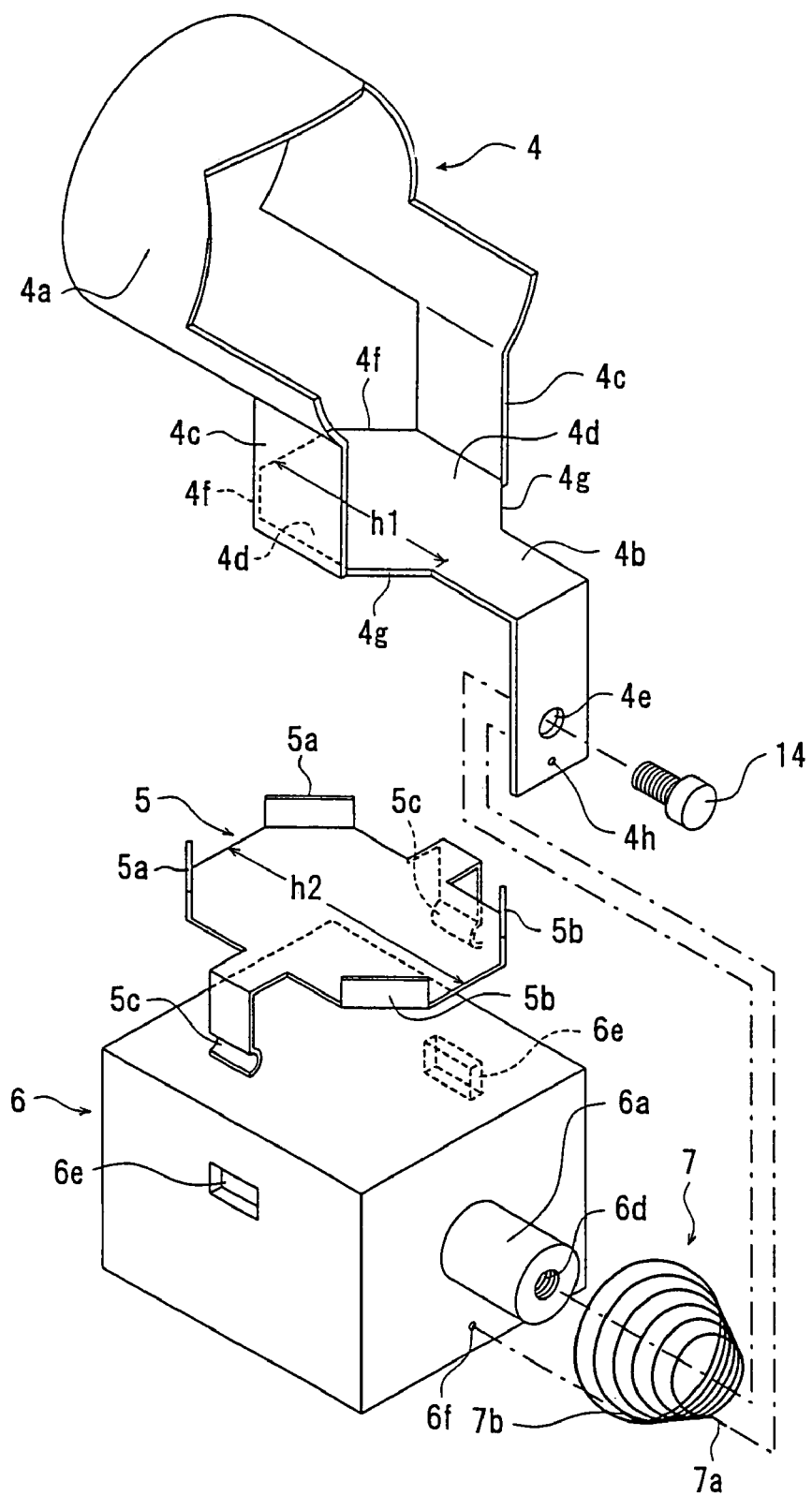
FIG. 2 is an assembly diagram of an adjustable shade, a stopper, a solenoid, and a coil spring.

As shown in FIG. 1 and FIG. 2, a headlamp 1 includes a light source 2, a reflector 3, an adjustable shade 4, a stopper 5, a solenoid 6, and a coil spring 7, a housing 8, a lens 9 for protecting the inside of the housing 8, an inner panel 10. In this embodiment, a vehicle headlamp for left side driving is explained as an example, however, it is also reversible to a vehicle headlamp for right side driving, and in this case, the configuration thereof becomes mirror reversed.

The light source 2 is a discharge lamp, for example, a high-pressure metal vapor discharge lamp such as a metal halide lamp, or a high intensity discharge lamp (HID). The light source 2 is detachably fitted to the reflector 3. The light source 2 is fitted to the reflector 3, so that it is arranged at a predetermined position with respect to the reflector 3. A connector 11 is detachably connected to the light source 2, and supplies power from a ballast 12 to the light source 2. Here, reference sign 12 denotes the ballast, which supplies high voltage necessary for startup of the discharge lamp, being the light source 2, and supplies stable voltage at the time of lighting up the discharge lamp.

An inner concave surface of the reflector 3 is subjected to aluminum evaporation or silver plating, and has a reflecting surface composed of a free-form surface deformed based on a paraboloid of revolution. This reflecting surface is provided with a first reflecting surface 3a which forms the light from the light source 2 into a predetermined light distribution pattern for passing by, and a second reflecting surface 3b which forms the light from the light source 2 into a predetermined light distribution pattern for driving. Reference sign 3c denotes an extension, which makes the adjustable shade 4 and the solenoid 6 not observable from the front of the headlamp 1, and is integrally formed with the reflector 3. The extension 3c may be provided separately from the reflector 3. The reflector 3 is fitted to the housing 8 via an optical axis-adjusting unit (not shown).

A cylindrical fixed shade 13, with the front side consisting of a thin steel sheet such as SUS being closed and the rear side opened, is fitted to the extension 3c by a fixing means such as a screw. This fixed shade 13 is fitted to the extension 3c, so that it is arranged in front of the light source 2. The fixed shade 13 arranged in front of the light source 2 shades direct light directly irradiated forwards, other than the light from the light source 2 irradiated onto the first reflecting surface 3a and the second reflecting surface 3b.

The adjustable shade 4 comprises an adjustable shade body 4a consisting of a thin steel sheet such as SUS and an adjustable shade stay 4b, as illustrated in FIG. 2. The adjustable shade body 4a is substantially in a cylindrical shape. The outer diameter of the adjustable shade body 4a is smaller than the inner diameter of the fixed shade 13, with the inner diameter being such that it does not come in contact with the light source 2. The adjustable shade body 4a is provided with leg portions 4c for being fitted to the adjustable shade stay 4b. On the other hand, the adjustable shade stay 4b is provided with two protruding portions 4d protruding in the width direction of the adjustable shade stay 4b on the front side (on the upper left side in FIG. 2) in the longitudinal direction. The rear side (the lower right side in FIG. 2) of the adjustable shade stay 4b in the longitudinal direction is partly bent perpendicularly. A fixing hole 4e is provided at a predetermined position of the adjustable shade stay 4b bent perpendicularly, for fixing the adjustable shade 4 to a plunger 6a of the solenoid 6 described later. The protruding portions 4d have high beam side abutting surfaces 4f and low beam side abutting surfaces 4g having an angle of inclination (for example, 45 degrees) with respect to the width direction of the adjustable shade stay 4b, respectively, on the front aide and the rear side lengthwise of the adjustable shade stay 4b. In other words, the high beam side abutting surfaces 4f and the low beam side abutting surfaces 4g are provided in the adjustable shade stay 4b in a truncated V shape. Reference sign 4h denotes a fitting hole on the adjustable shade side for fitting a coil spring 7 between the adjustable shade 4 and the solenoid 6. The adjustable shade 4 is fitted herein such that the adjustable shade body 4a is fitted to the adjustable shade stay 4b by the leg portions 4c, but the adjustable shade body 4a and the adjustable shade stay 4b may be integrally formed.

As illustrated in FIG. 2, the stopper 5 consists of a thin steel sheet such as SUS in a rectangular shape. At four corners of the stopper 5, high beam side protrusions 5a and low beam side protrusions 5b are respectively provided so as to protrude upwards, in parallel with the high beam side abutting surfaces 4f and the low beam side abutting surfaces 4g of the protruding portions 4d of the adjustable shade stay 4b. In other words, the high beam side protrusions 5a and the low beam side protrusions 5b are provided on the stopper 5 in a truncated V shape. Further, a part of the stopper 5 is bent perpendicularly. The part of the bent stopper 5 is provided with two engaging protrusions 5c corresponding to engaging holes 6e in the solenoid 6 described later. The longitudinal length h2 of the stopper 5 is equal to a distance by which the adjustable shade 4 moves from the low beam position to the high beam position (a length combining a stroke of the plunger 6a of the solenoid 6 and a length h1 of the protruding portions 4d of the adjustable shade 4 in a longitudinal direction). It is desired that the high beam side protrusions 5a and the low beam side protrusions 5b have resilience. As a result, abutting noise, that is, the operating noise generated when the high beam side abutting surfaces 4f and the low beam side abutting surfaces 4g of the adjustable shade stay 4b respectively abut against the high beam side protrusions 5a and the low beam side protrusions 5b, can be reduced.

Figure 3A:
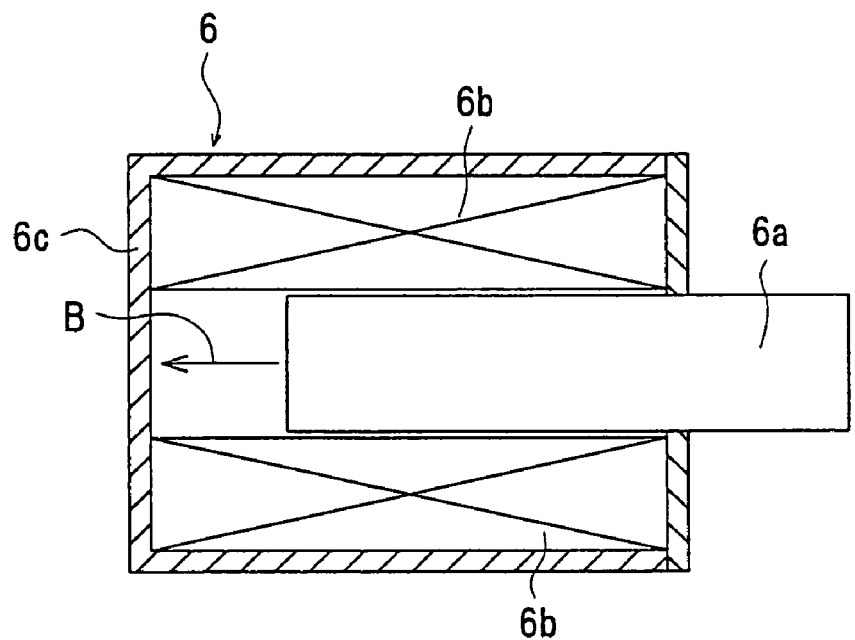
FIG. 3A is a schematic diagram of a solenoid in a state that an electric current is not applied.
Figure 3B:
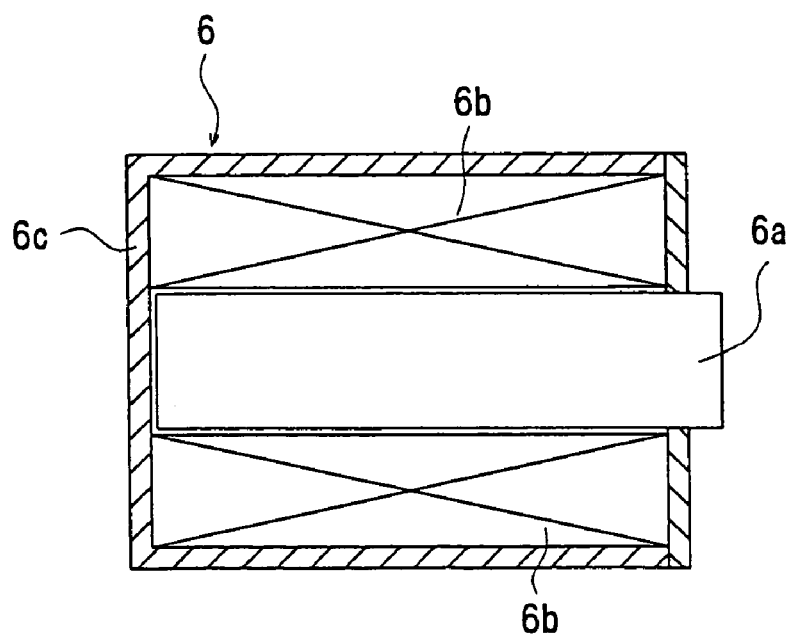
FIG. 3B is a schematic diagram of the solenoid in a state that the electric current is applied.

As illustrated in FIG. 2 and FIG. 3A, the solenoid 6 is a pull-type solenoid, and comprises a plunger 6a, a coil 6b, and a solenoid yoke 6c. This pull-type solenoid can form a compact solenoid, since there is no protrusion in the movement direction of the plunger 6a of the solenoid 6. The plunger 6a is in a cylindrical shape, and is provided with a fixing hole 6d for fixing the adjustable shade stay 4b of the adjustable shade 4 at the end portion of the plunger 6a. The coil 6b is provided within the solenoid yoke 6c so as to surround the plunger 6a. The plunger 6a moves in a direction of arrow B due to a magnetic force of the coil 6b, as illustrated in FIG. 3B, by applying the electric current to the coil 6b. The stroke of the plunger 6a is set to a length by which the adjustable shade 4 can move between the low beam position and the high beam position. The solenoid 6 is provided with two engaging holes 6e at positions corresponding to the engaging protrusions 5c of the stopper 5. Reference sign 6f denotes a fitting hole on the solenoid side for fitting the coil spring 7 between the solenoid 6 and the adjustable shade 4. Though not illustrated in the figure, the solenoid 6 is fitted to the housing 8.

The coil spring 7 is, as illustrated in FIG. 2, obtained by winding a wire rod having resilience in a cone-shape. The coil spring 7 is provided with end portions 7a and 7b inserted into the adjustable shade side fitting hole 4h of the adjustable shade stay 4b and a fitting hole 6f of the solenoid 6. Here, the axial length of the coil spring is slightly longer than the stroke of the plunger 6a of the solenoid 6. This is for fitting the coil spring 7 between the adjustable shade 4 and the solenoid 6 in at the high beam position. It is desired that the wire rod be wound in a cone-shape so that the wire rod does not come in contact with each other when the coil spring 7 contracts. As a result, the axial length of the coil spring when the coil spring 7 contracts becomes smaller than that of a cylindrical coil spring, and the length of the plunger 6a of the solenoid 6 can be made a length necessary for the plunger 6a to stroke, thereby enabling a compact solenoid 6.

Figure 4:
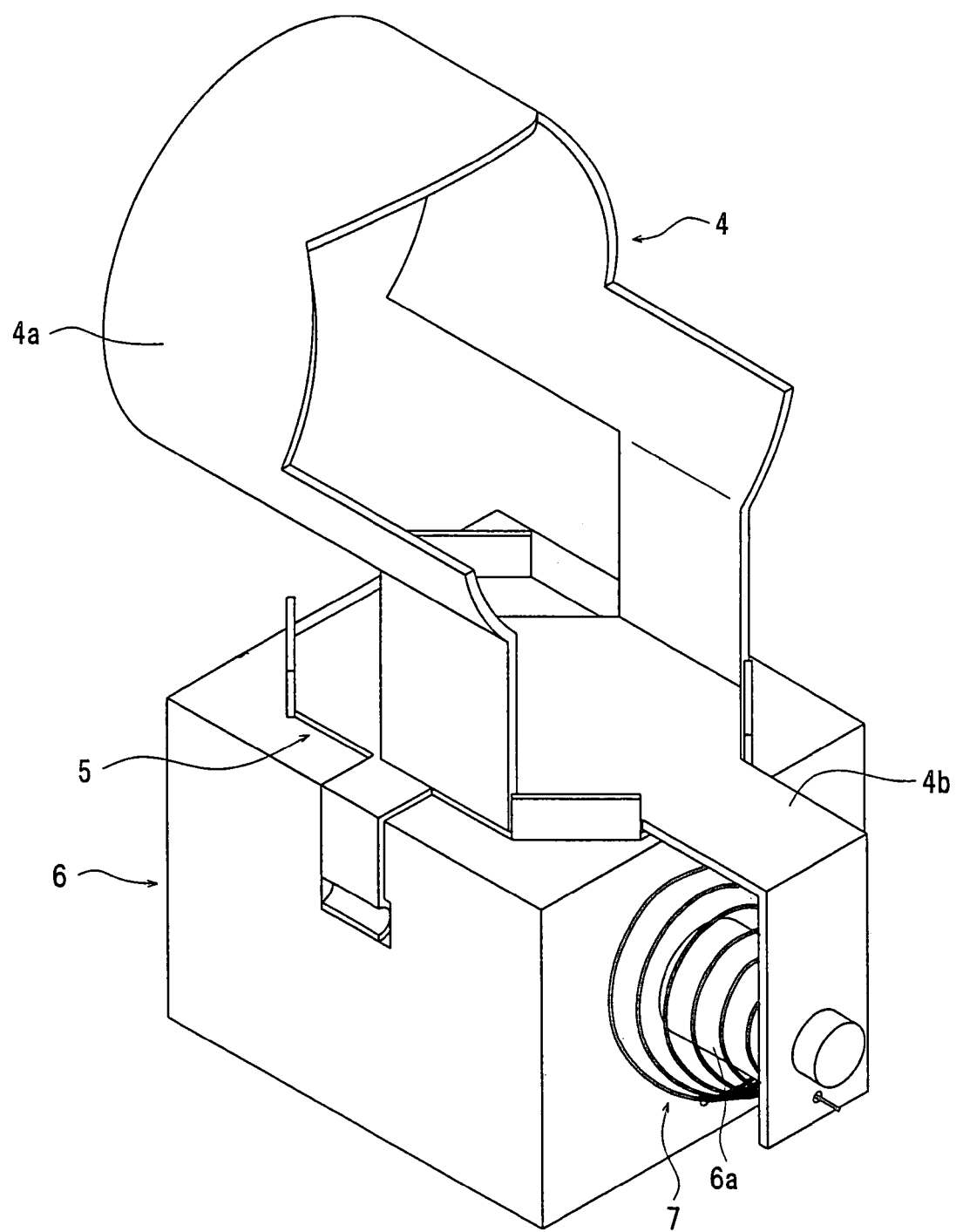
FIG. 4 is a schematic diagram of the adjustable shade, the stopper, the solenoid, and the coil spring.

The assembly of the adjustable shade 4, the stopper 5, the solenoid 6, and the coil spring 7 will be explained below. As illustrated in FIG. 2 and FIG. 4, at first, the engaging protrusion 5c of the stopper 5 is inserted into the engaging hole 6e of the solenoid 6. As a result, the stopper 5 is engaged on the upper part of the solenoid 6. The coil spring 7 is then arranged on the outer periphery of the plunger 6a of the solenoid 6. At this time, the end portion 7b of the coil spring 7 is inserted into the fitting hole 6f of the solenoid 6.

The adjustable shade 4 is then arranged on the stopper 5, so that the two protruding portions 4d of the adjustable shade stay 4b are located within the protrusions 5a and 5b of the stopper 5. The end portion 7a of the coil spring 7 is inserted into the adjustable shade side fitting hole 4h of the adjustable shade stay 4b. A bolt 14 is fastened into the fixing hole 6d of the plunger 6a of the solenoid 6 via the fixing hole 4e in the adjustable shade 4. As a result, the adjustable shade 4 is fixed to the plunger 6a. Thus, the adjustable shade 4, the stopper 5, the solenoid 6, and the coil spring 7 are assembled. As a result, the solenoid 6 is fixed to the housing 8, and the adjustable shade 4 is arranged at a predetermined position with respect to the light source 2 and the fixed shade 13. The bolt 14 is used here for fixing the adjustable shade 4 to the plunger 6a of the solenoid 6, but the adjustable shade 4 may be fixed by using a rivet or by spot welding.

Figure 6A:
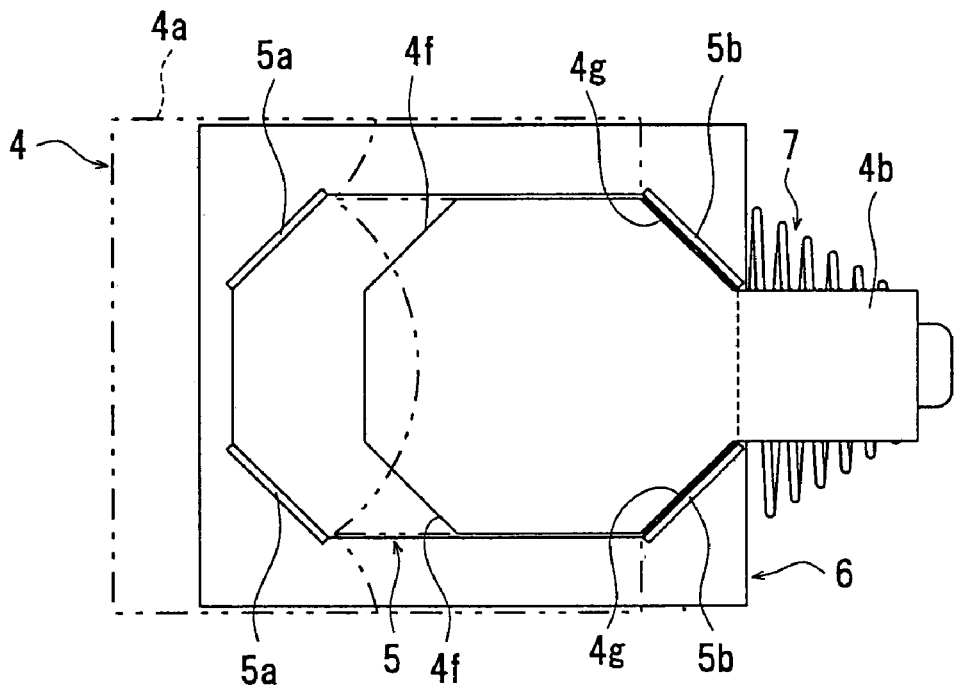
FIG. 6A is a plan view of the headlamp with the adjustable shade at the low beam position.
Figure 6B:
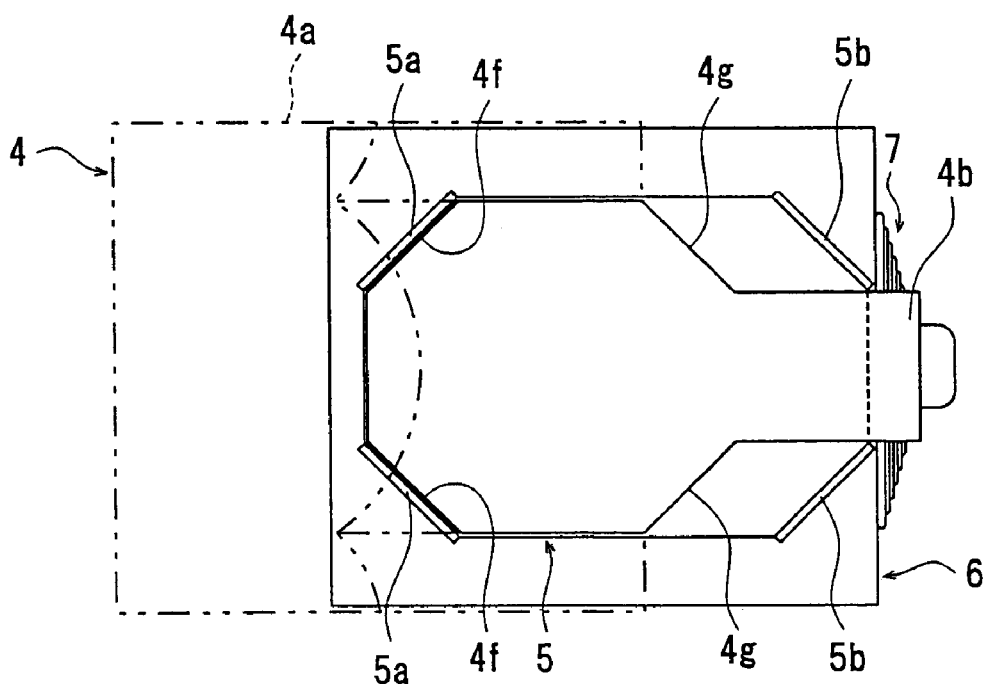
FIG. 6B is a plan view of the headlamp with the adjustable shade at the high beam position.
Figure 7A:
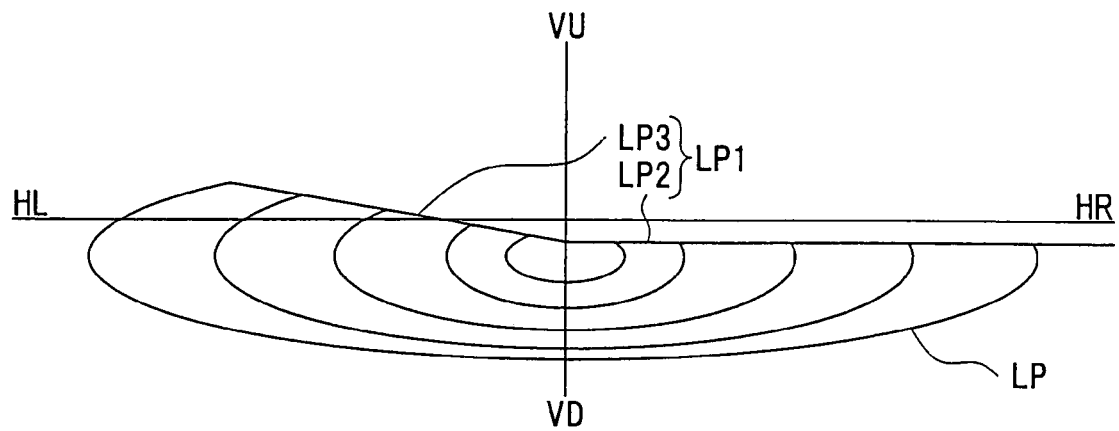
FIG. 7A is a graph of a light distribution pattern of the low beam.
Figure 7B:
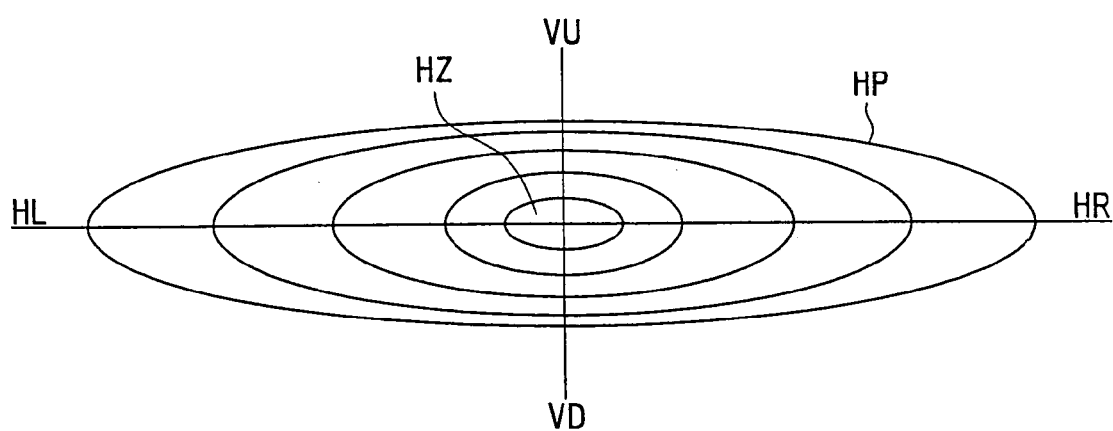
FIG. 7B is a graph of a light distribution pattern of the high beam.

The operation of the headlamp according to the present invention will be explained with reference to FIGS. 5 to 7. Here, the light distribution patterns illustrated in FIG. 7A and FIG. 7B are diagrams which illustrate light distribution patterns projected onto a shade 10m ahead from the headlamp 1 according to the present invention. Reference sign "HL-HR" in these figures indicates a horizontal line on the right and left on the shade, and reference sign "VU-VD" indicates a vertical line on the up and down of the shade.

The adjustable shade 4 stops at the low beam position when the electric current is not applied to the coil 6b of the solenoid 6. In other words, the two abutting surfaces 4g of the adjustable shade stay 4b, being the stopper mechanism, abut against the two low beam side protrusions 5b of the stopper 5. Since the coil spring 7 is fitted between the adjustable shade stay 4b and the solenoid 6 at the high beam position, the low beam side abutting surfaces 4g abut against the low beam side protrusions 5b in a pressed state. Therefore, the adjustable shade stay 4b does not move in either direction lengthwise. Further, since the adjustable shade stay 4b does not move in the width direction as well, since the low beam side abutting surfaces 4g and the low beam side protrusions 5b are in a truncated V shape. As a result, the adjustable shade 4 does not shift from the low beam position due to vibrations of the vehicle. Here, electric power is supplied to the ballast 12 illustrated in FIG. 1, to thereby light up the light source 2. The light from the lighted light source 2 is partly shaded by the adjustable shade body 4a of the adjustable shade 4 stopping at the low beam position. The unshaded light from the light source 2 is irradiated as irradiation light L1 onto the first reflecting surface 3a of the reflector 3. The first reflecting surface irradiates the reflecting light L11 forward by the irradiation light L1. By this reflecting light L11, the predetermined light distribution pattern LP for passing by, as illustrated in FIG. 7A, is obtained. This light distribution pattern LP has a light-dark boundary LP1 so as to restrict glare. This LP1 comprises a horizontal line portion LP2 for not giving glare to a car running in the opposite lane, and a gradually inclined line portion LP3 for checking visually a pedestrian walking on the shoulder of the road on the left side without giving glare to the pedestrian.

As illustrated in FIG. 3B, when the electric current is applied to the coil 6b in the solenoid 6, the plunger 6a moves in the direction of arrow B due to a magnetic force generated from the coil. In other words, an attraction for attracting the plunger 6a is generated in the solenoid 6, and the adjustable shade 4 fixed to the plunger 6a starts to move in the direction of arrow A, as illustrated in FIG. 5A and FIG. 6A. An elastic force is generated in the coil spring 7 fitted between the adjustable shade 4 and the solenoid 6. The elastic force of the coil spring 7 acts in a direction attenuating the attraction of the solenoid 6.

Figure 8:
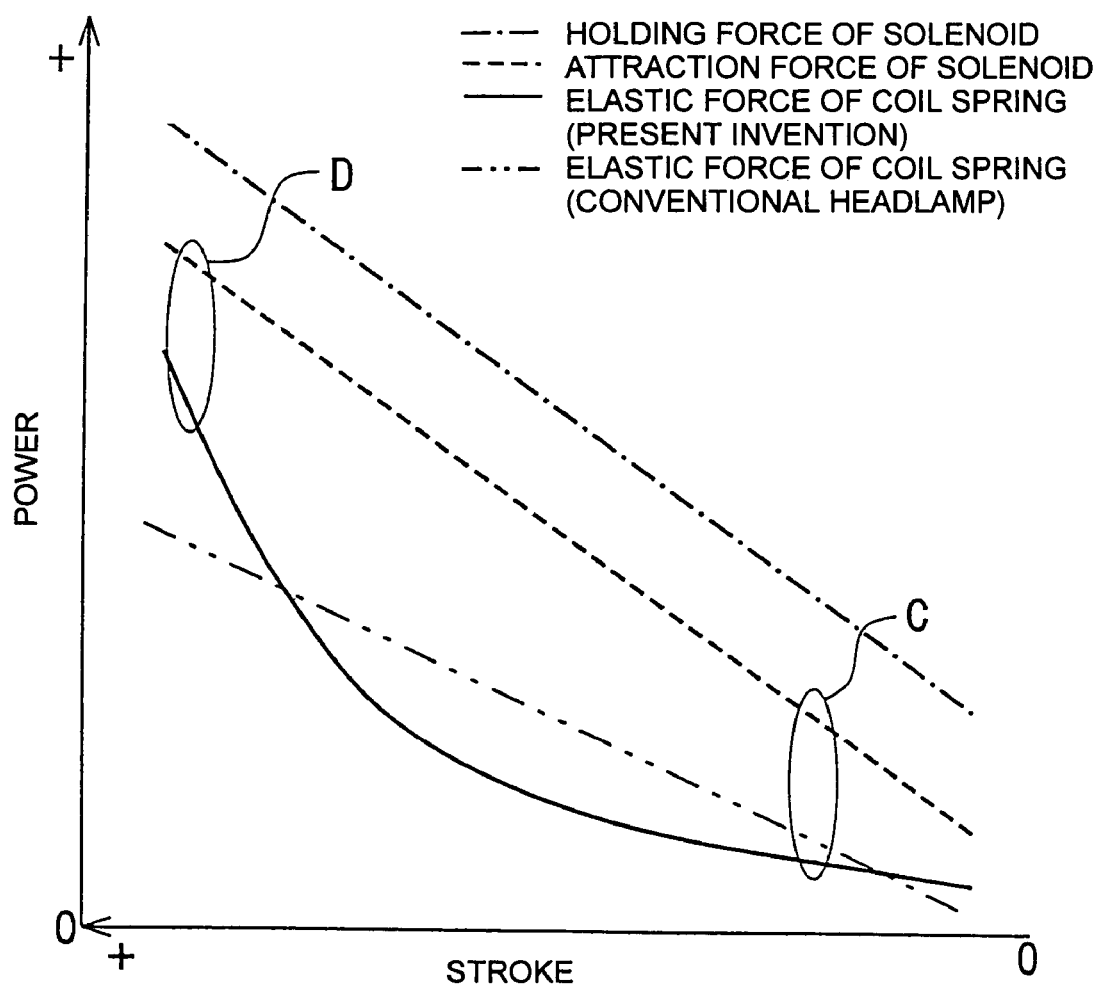
FIG. 8 is a graph of the relation between a force generated in the solenoid, a force generated in the coil spring, and a stroke of a plunger.

The relation between the force generated in the solenoid, the force generated in the coil spring, and the stroke of the plunger will be explained below. In the stroke as illustrated in FIG. 8, the direction to which the plunger 6a of the solenoid 6 is attracted is designated as the plus direction (+). As illustrated in FIG. 8, the attraction of the solenoid 6 (shown by the dotted line in FIG. 8) increases in proportion to the stroke of the plunger 6a. On the other hand, the elastic force of the coil spring 7 (shown by the solid line in FIG. 8) gradually increases at the initial stage of attracting the plunger 6a into the solenoid 6, since the coil spring 7 has a cone-shape. In other words, as shown by arrow C in FIG. 8, the difference between the attraction of the solenoid 6 and the elastic force of the coil spring 7 is gradually reduced, as compared with the difference between the attraction of the solenoid 6 and the elastic force of the cylindrical coil spring (shown by the two-dot chain line in FIG. 8). Therefore, since the elastic force of the coil spring 7 acts so as not to attenuate the attraction of the solenoid 6 too much, the adjustable shade 4 fitted to the plunger 6a can easily move from the low beam position to the high beam position.

The elastic force of the coil spring 7 rapidly increases at the last stage of attracting the plunger 6a into the solenoid 6. In other words, as shown by arrow D in FIG. 8, the difference between the attraction of the solenoid 6 and the elastic force of the coil spring 7 is rapidly reduced, as compared with the difference between the attraction of the solenoid 6 and the elastic force of the cylindrical coil spring. Therefore, the elastic force of the coil spring 7 acts so as to attenuate the attraction of the solenoid 6 rapidly. As a result, as the adjustable shade 4 fitted to the plunger 6a approaches the high beam position from the low beam position, the moving speed of the adjustable shade 4 decreases. In the state that the moving speed thereof decreases, the two high beam side abutting surfaces 4f of the adjustable shade stay 4b, being the stopper mechanism, abut against the two high beam side protrusions 5a of the stopper 5. As a result, the abutting noise, being the operating noise generated when the high beam side abutting surfaces 4f abut against the high beam side protrusions 5a, can be reduced.

Figure 9A:
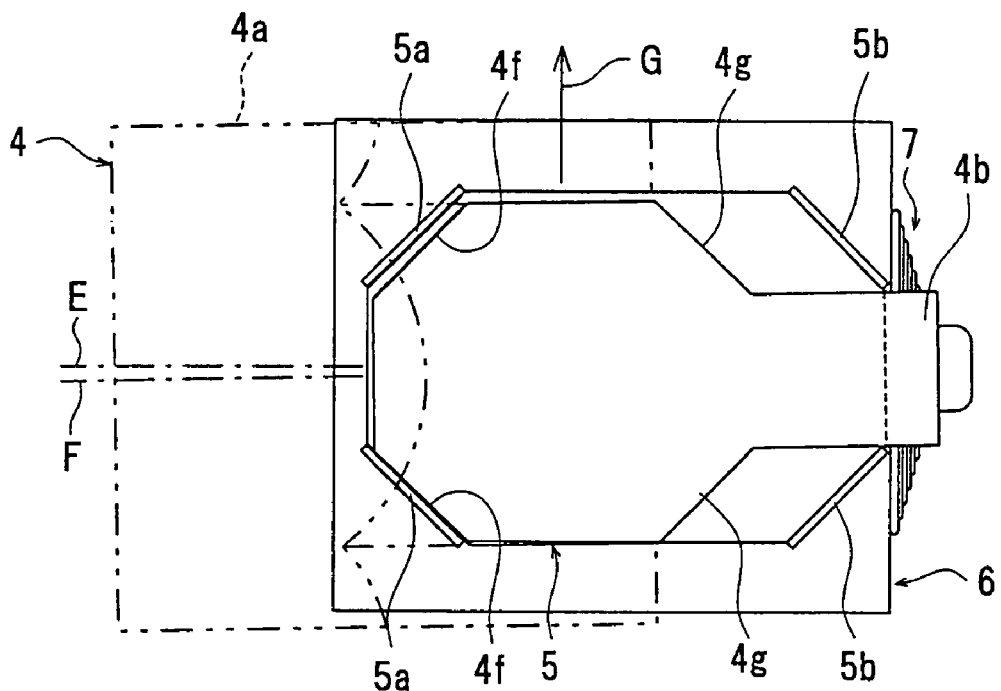
FIG. 9A is a plan view of the adjustable shade in the state of the high beam side in which abutting surfaces are deviated each other.

When the adjustable shade 4 moves from the low beam position to the high beam position, the adjustable shade 4 may move in a state shifted from the scheduled moving direction, due to vibrations of the vehicle or a gap between the plunger 6a and the coil 6b of the solenoid 6. As illustrated in FIG. 9A, when the adjustable shade 4 moves in a direction of arrow F, being a direction shifted from the scheduled moving direction, which is shown by arrow E, the high beam side abutting surfaces 4f of the adjustable shade stay 4b abut against the high beam side protrusions 5a of the stopper 5 in the shifted state. At this time, either one of the two high beam side abutting surfaces 4f first abuts against either one of the high beam side protrusions 5a.

Figure 9B:
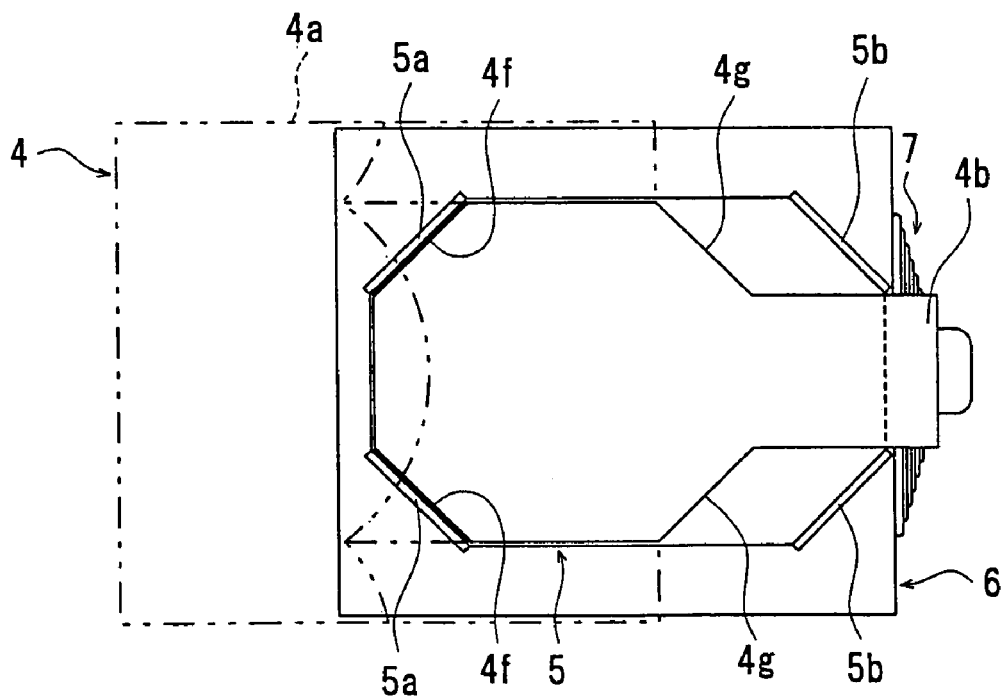
FIG. 9B is a plan view of the adjustable shade in the state of the high beam side in which the abutting surfaces are corrected to match each other.

The high beam side abutting surfaces 4f have an angle of inclination with respect to the width direction of the adjustable shade stay 4b. Therefore, when the adjustable shade 4 tries to move further in the direction of arrow F, the high beam side abutting surfaces 4f slide in a direction of arrow G, along the high beam side protrusions 5a. This is because the two high beam side abutting surfaces 4f and the two high beam side protrusions 5a are provided in the adjustable shade stay 4b and the stopper 5, respectively, in a truncated V shape. Therefore, the adjustable shade 4 is corrected so as to move in the direction of arrow E, being the scheduled moving direction, due to a resultant force of a force trying to move in the direction of arrow F and a force trying to move in the direction of arrow G. When the adjustable shade 4 tries to move further in the direction of arrow F, as illustrated in FIG. 9B, the other of the high beam side abutting surface 4f abuts against the high beam side protrusion 5a, and hence, the adjustable shade 4 can reliably stop at the high beam position.

The high beam side abutting surfaces 4f of the adjustable shade stay 4b maintain the state pressed and abutting against the high beam side protrusions 5a of the stopper 5, by continuing to apply the electric current to the coil 6b in the solenoid 6. Therefore, the adjustable shade 4 stops at the high beam position. As a result, the adjustable shade stay 4b does not move in either direction lengthwise. Further, since the high beam side abutting surfaces 4f and the high beam side protrusions 5a are in the truncated V shape, the adjustable shade stay 4b does not move in either direction widthwise. As a result, the adjustable shade 4 does not shift from the high beam position due to vibrations of the vehicle. The light from the light source 2 shaded by the adjustable shade body 4a when the adjustable shade 4 is in the low beam position is irradiated onto the second reflecting surface 3b of the reflector 3 as the irradiation light L2. The second reflecting surface 3b irradiates reflecting light L12 forward by the irradiation light L2. The predetermined light distribution pattern HP for driving as illustrated in FIG. 7B is obtained from the reflecting light L12 and the reflecting light L11. The light distribution pattern HP is a pattern obtained by taking into consideration the maximum luminous intensity value and the maximum luminous intensity band, and a hot zone HZ (maximum luminous intensity band including the maximum luminous intensity point) is formed in the central portion thereof.

When the adjustable shade 4 stops at the high beam position, the axial length of the coil spring 7 becomes short, that is, contracts from H1 to H2, as illustrated in FIG. 5B. Here, when applying the electric current to the coil in the solenoid 6 is stopped, the adjustable shade 4 returns to the low beam position due to the elastic force of the coil spring 7 in the state with the axial length contracting to H2. At this time, as illustrated in FIG. 7, the holding power (the single-dot chain line in FIG. 8) of the solenoid 6 acts so as to attenuate the elastic force of the coil spring 7. Therefore, as the adjustable shade 4 fitted to the plunger 6a approaches the low beam position from the high beam position, the moving speed of the adjustable shade 4 decreases. The two low beam side abutting surfaces 4g of the adjustable shade stay 4b, being the stopper mechanism, abut against the two low beam side protrusions 5b of the stopper 5, with the moving speed decreasing. As a result, the abutting noise, being the operating noise generated when the low beam side abutting surfaces 4g abut against the low beam side protrusions 5b can be reduced.

As a result, the position of the adjustable shade 4 can be switched to either the low beam position or the high beam position, as illustrated in FIG. 1. Further, when the high beam side abutting surfaces 4f and the low beam side abutting surfaces 4g of the adjustable shade 4 on the movable side, abut against the high beam side protrusions 5a and the low beam side protrusions 5b of the stopper on the fixed side, the movable side abuts against the fixed side gradually, to thereby decrease the abutting noise. As a result, the operating noise at the time of switching the position of the adjustable shade 4 can be reduced. Further, since the coil spring 7 has a function as a buffer member, it is not necessary to newly provide a buffer member between the movable side and the fixed side, thereby making the solenoid 6 compact. A complicated mechanism, for example, a pin or a bush for restricting the rotation direction of the adjustable shade, is not necessary as the stopper mechanism, and the adjustable shade 4 can be stopped at the low beam position or the high beam position with a simple configuration. As a result, the assembly time and the manufacturing cost of the headlamp 1 can be reduced.

In this embodiment, a pull-type solenoid is used as a driving means of the adjustable shade 4, but a push-type solenoid may be used. In this case, when the plunger 6a is pushed out, the coil spring 7 needs only to be fitted between the adjustable shade 4 and a fixing member (for example, the housing 8) separately provided, so that the coil spring 7 contracts in the direction of pushing out the plunger 6a.

In the present invention, the high beam side abutting surfaces 4f and the low beam side abutting surfaces 4g have an angle of inclination with respect to the width direction of the adjustable shade stay 4b, and the high beam side protrusions 5a and low beam side protrusions 5b are provided in parallel with the high beam side abutting surfaces 4f and the low beam side abutting surfaces 4g. However, at the time of switching the position of the adjustable shade 4, when there is no possibility that the adjustable shade stay 4b shifts in the width direction thereof, the high beam side abutting surfaces 4f, the low beam side abutting surfaces 4g, the high beam side protrusions 5a and the low beam side protrusions 5b may be provided in parallel with the width direction of the adjustable shade stay 4b.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A headlamp comprising:
   a light source;
   a shade that forms a light distribution pattern for a low beam when the shade is in a low beam position and a light distribution pattern for a high beam when the shade is in a high beam position with a light from the light source;
   a solenoid having a plunger configured to move the shade from the low beam position to the high beam position via a magnetic force;
   a stopper mechanism configured to stop the shade at either of the low beam position and the high beam position; and
   a spring configured to move the shade from the high beam position to the low beam position via an elastic force, wherein a difference between the magnetic force and the elastic force initially increases and then decreases over the stroke of the plunger, to change a moving speed of the shade as the shade moves position.

2. The headlamp according to claim 1, wherein the spring includes a cone-shaped coil spring.

3. The headlamp according to claim 1, wherein the stopper mechanism comprises:
   a stopper including one or more protrusions; and
   one or more abutting surfaces of the shade, wherein the one or more abutting surfaces of the shade abut against the one or more protrusions when the shade is in either of the low beam position and the high beam position.

4. The headlamp according to claim 3, wherein the one or more protrusions have angles with respect to a longitudinal direction of the solenoid, and
   each of the protrusions are provided in parallel to the corresponding abutting surfaces.

5. The headlamp according to claim 3, wherein the protrusions have an elasticity.

6. The headlamp according to claim 3, wherein the shade includes four abutting surfaces.

7. The headlamp according to claim 3, wherein the stopper includes four protrusions.

8. The headlamp according to claim 1, wherein the solenoid is a pull-type solenoid.

9. The headlamp according to claim 1, wherein the elastic force of the spring changes as the spring shifts position.

10. The headlamp according to claim 1, wherein the spring is positioned between the solenoid and a portion of the shade.

11. The headlamp according to claim 1, wherein the magnetic force of the solenoid changes as the solenoid shifts position.

12. The headlamp according to claim 1, wherein at least part of the shade is curved to form a hollow portion, and the light source is positioned in the hollow portion.

13. A headlamp comprising:
- a light source;
- a shade that forms a light distribution pattern for a low beam when the shade is in a low beam position and a light distribution pattern for a high beam when the shade is in a high beam position with a light from the light source;
- a solenoid that slides the shade from the low beam position to the high beam position;
- a stopper mechanism that stops the shade at either of the low beam position and the high beam position; and
- a spring that slides the shade from the high beam position to the low beam position,
- wherein when the solenoid and spring move the shade, the shade slides substantially parallel to an optic axis of the light source.

14. A headlamp comprising:
- a light source;
- a shade that forms a light distribution pattern for a low beam when the shade is in a low beam position and a light distribution pattern for a high beam when the shade is in a high beam position with a light from the light source;
- a solenoid configured to move the shade from the low beam position to the high beam position via a magnetic force;
- a stopper mechanism configured to stop the shade at either of the low beam position and the high beam position; and
- a spring configured to move the shade from the high beam position to the low beam position via an elastic force, wherein a difference between the magnetic force and the elastic force to change a moving speed of the shade as the shade moves position,
- wherein when the solenoid and spring move the shade, the shade slides on a surface of the stopper mechanism.

15. A headlamp comprising:
- a light source;
- a shade that forms a light distribution pattern for a low beam when the shade is in a low beam position and a light distribution pattern for a high beam when the shade is in a high beam position with a light from the light source;
- a solenoid configured to move the shade from the low beam position to the high beam position via a magnetic force;
- a stopper mechanism configured to stop the shade at either of the low beam position and the high beam position; and
- a spring configured to move the shade from the high beam position to the low beam position via an elastic force, wherein a difference between the magnetic force and the elastic force to change a moving speed of the shade as the shade moves position,
- wherein the stopper mechanism comprises:
  - a stopper including one or more protrusions: and
  - one or more abutting surfaces of the shade, wherein the one or more abutting surfaces of the shade abut against the one or more protrusions when the shade is in either of the low beam position and the high beam position, wherein the shade slides along a surface of the stopper when the solenoid and spring move the shade.

\* \* \* \* \*